US007764526B1

(12) United States Patent
Xing et al.

(10) Patent No.: US 7,764,526 B1
(45) Date of Patent: Jul. 27, 2010

(54) HYSTERETIC MODE CONTROLLER FOR CAPACITOR VOLTAGE DIVIDER

(75) Inventors: Kun Xing, Cary, NC (US); Shea Lynn Petricek, Yokohama (JP)

(73) Assignee: Intersil Americas Inc., Milpitas, CA (US)

( * ) Notice: Subject to any disclaimer, the term of this patent is extended or adjusted under 35 U.S.C. 154(b) by 647 days.

(21) Appl. No.: 11/758,450

(22) Filed: Jun. 5, 2007

Related U.S. Application Data

(60) Provisional application No. 60/862,010, filed on Oct. 18, 2006.

(51) Int. Cl.
*H02M 3/06* (2006.01)
*H02M 3/18* (2006.01)
*H02M 7/00* (2006.01)

(52) U.S. Cl. .......................................... 363/62; 363/60
(58) Field of Classification Search ............. 363/60–62; 320/166
See application file for complete search history.

(56) References Cited

U.S. PATENT DOCUMENTS

| 5,457,421 | A  | * | 10/1995 | Tanabe .................... 327/530 |
| 6,411,531 | B1 | * | 6/2002  | Nork et al. ................ 363/60 |
| 6,646,415 | B1 | * | 11/2003 | Nebrigic et al. ............. 320/166 |
| 6,989,999 | B2 | * | 1/2006  | Muramatsu et al. ........... 363/60 |
| 6,995,995 | B2 | * | 2/2006  | Zeng et al. .................. 363/60 |
| 7,099,167 | B2 | * | 8/2006  | Fujise ........................ 363/62 |

* cited by examiner

*Primary Examiner*—Bao Q Vu
*Assistant Examiner*—Jue Zhang
(74) *Attorney, Agent, or Firm*—Gary R. Stanford

(57) ABSTRACT

A hysteretic mode controller for controlling a capacitor voltage divider which has a flying capacitor. In one embodiment, the hysteretic mode controller includes an amplifier, a gain circuit and a hysteretic comparator circuit. The amplifier has an input for coupling to the flying capacitor and an output providing a fly voltage. The gain circuit has an input for receiving the input voltage and an output coupled to a reference node providing a reference voltage. The hysteretic comparator circuit has a first input coupled to the output of the amplifier, a second input receiving the reference voltage, and an output for providing a PWM signal to control the capacitor voltage divider. The fly voltage is compared to voltage limits of a hysteretic voltage window for switching the PWM signal. The switching frequency is increased with higher load current to maintain high efficiency.

20 Claims, 6 Drawing Sheets

HYSTERETIC MODE CONTROLLER FOR CAPACITOR VOLTAGE DIVIDER

CROSS-REFERENCE TO RELATED APPLICATIONS

This application claims the benefit of U.S. Provisional Application Ser. No. 60/862,010, filed on Oct. 18, 2006, which is herein incorporated by reference for all intents and purposes.

BACKGROUND OF THE INVENTION

1. Field of the Invention

The present invention relates to power electronics, and more particularly to a hysteretic mode controller for a capacitor voltage divider for dividing a voltage with high efficiency.

2. Description of the Related Art

Electronic circuits use a variety of voltage levels suitable for various purposes. Lower voltage levels are suitable for smaller devices to prevent damage or to reduce power. A power or voltage converter is often used to reduce a higher voltage to a lower voltage level, such as a conventional buck converter or the like. A buck converter, however, has several disadvantages, such as diode reverse recovery, inductor power loss, etc. Capacitive voltage dividers have also been used to reduce voltage level and do not have many of the disadvantages of conventional converters. It is desired to maximize efficiency of a capacitive voltage divider within an electronic circuit.

BRIEF DESCRIPTION OF THE DRAWINGS

The benefits, features, and advantages of the present invention will become better understood with regard to the following description, and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
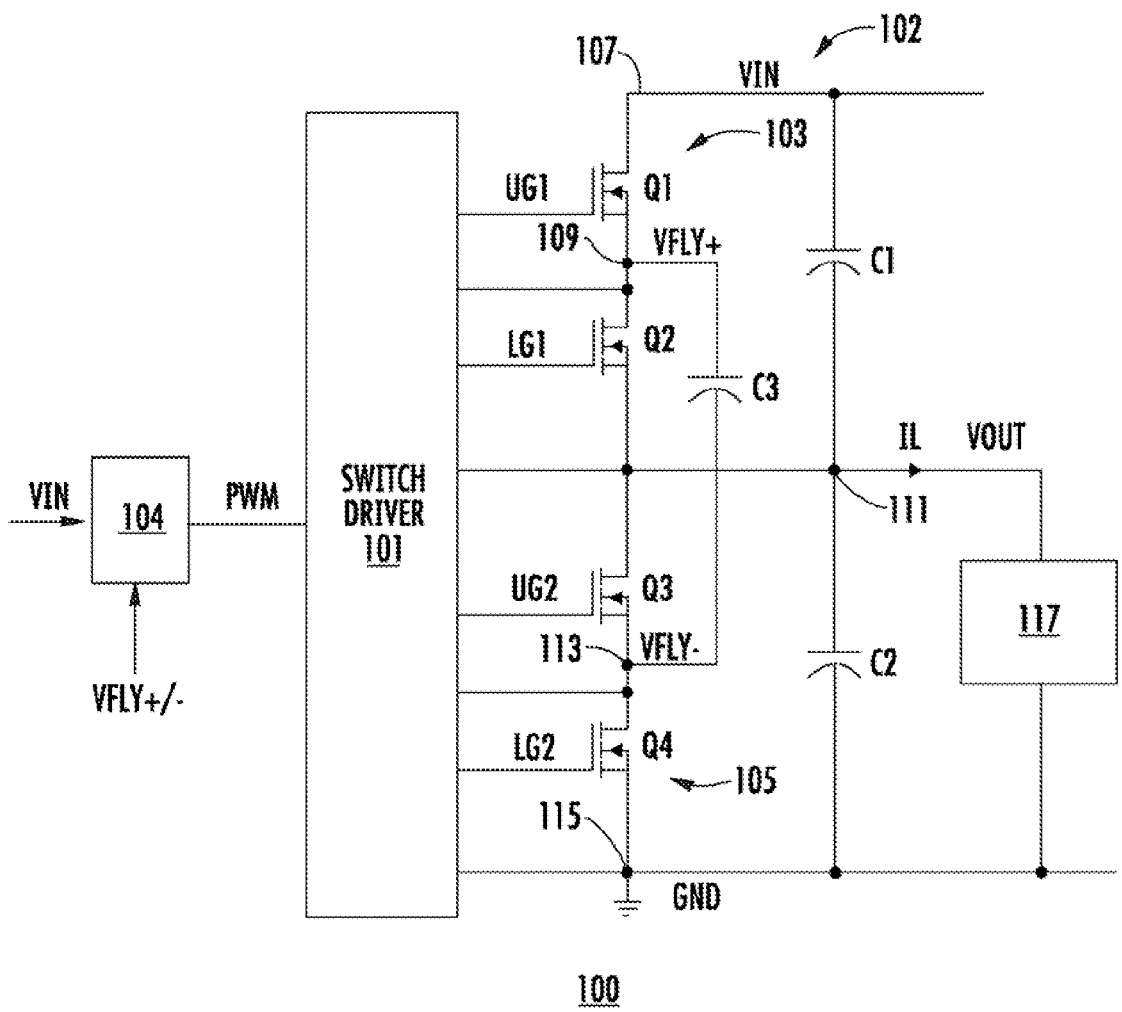
FIG. 1 is a schematic and block diagram of a capacitor voltage divider with hysteretic mode control circuit implemented according to an exemplary embodiment.

FIG. 1 is a schematic and block diagram of a capacitor voltage divider with hysteretic mode control circuit 100 implemented according to an exemplary embodiment. The capacitor voltage divider with hysteretic mode control circuit 100 includes a capacitor voltage divider 102 controlled by a pulse width modulation (PWM) signal and a hysteretic mode controller 104 providing the PWM signal. The capacitor voltage divider 102 includes an upper switch circuit 103, a lower switch circuit 105, and a capacitor C3. The upper switch circuit 103 includes a pair of electronic switches Q1 and Q2 and a capacitor C1 and the lower switch circuit 105 includes another pair of electronic switches Q3 and Q4 and another capacitor C2. In the illustrated embodiment, the electronic switches Q1-Q4 are each configured as an N-channel metal oxide semiconductor, field-effect transistor (MOSFET), although other types of electronic switches are contemplated (e.g., P channel devices, other types of FETs, other types of transistors, etc.). Q1 has a drain coupled to an input node 107 providing an input voltage VIN and a source coupled to a first phase node 109 developing a positive "fly" voltage VFLY+. Q2 has a drain coupled to phase node 109 and a source coupled to an output node 111 developing an output voltage VOUT. Q3 has a drain coupled to the output node 111 and a source coupled to a second phase node 113 developing a negative "fly" voltage VFLY−. Q4 has a drain coupled to the phase node 113 and a source coupled to a reference node 115, which is shown as a ground (GND) node. The capacitor C1 is coupled between the input and output nodes 107 and 111, and the capacitor C2 is coupled between the output and reference nodes 111 and 115. The capacitor C3 is a "flying" capacitor coupled between the positive and negative fly nodes 109 and 113.

The switch driver circuit 101 has an input receiving the PWM signal, a first output providing a first upper gate signal UG1 to the gate of Q1, a second output providing a first lower gate signal LG1 to the gate of Q2, a third output providing a second upper gate signal UG2 to the gate of Q3, and fourth output providing a second lower gate signal LG2 to the gate of Q4. The switch driver circuit 101 is configured to drive the control inputs of the electronic switches Q1-Q4, such as, for example, a MOSFET gate driver circuit for driving the gates of the switches Q1-Q4 when implemented as MOSFETs. The switch driver circuit 101 is also shown with inputs for sensing the phase nodes 109 and 113 and the output node 111. In operation, the switch driver circuit 101 drives the upper gate signals UG1 and UG2 high to turn on the switches Q1 and Q3 when the PWM signal is in an active state (e.g., at a high logic level), and drives the lower gate signals LG1 and LG2 high to turn on the switches Q2 and Q4 when the PWM signal is in an inactive state (e.g., at a logic low level). The switch driver circuit 101 also operates to ensure that the upper switches Q1 and Q3 are not turned on at the same time as the lower switches Q2 and Q4, and vice-versa. For example, the switches Q2 and Q4 are turned off before the switches Q1 and Q3 are turned on, and the switches Q1 and Q3 are turned off before the switches Q2 and Q4 are turned on, and so on.

The hysteretic mode controller 104 receives the VFLY+ and VFLY− signals (VFLY+/−) and the VIN signal and controls the PWM signal to maintain VOUT at approximately one-half the voltage level of VIN. The capacitor voltage divider with hysteretic mode control circuit 100 provides the VOUT signal to a load circuit 117 coupled between nodes 111 and 115. The load circuit 117 receives a load current IL from node 111.

Figure 2:
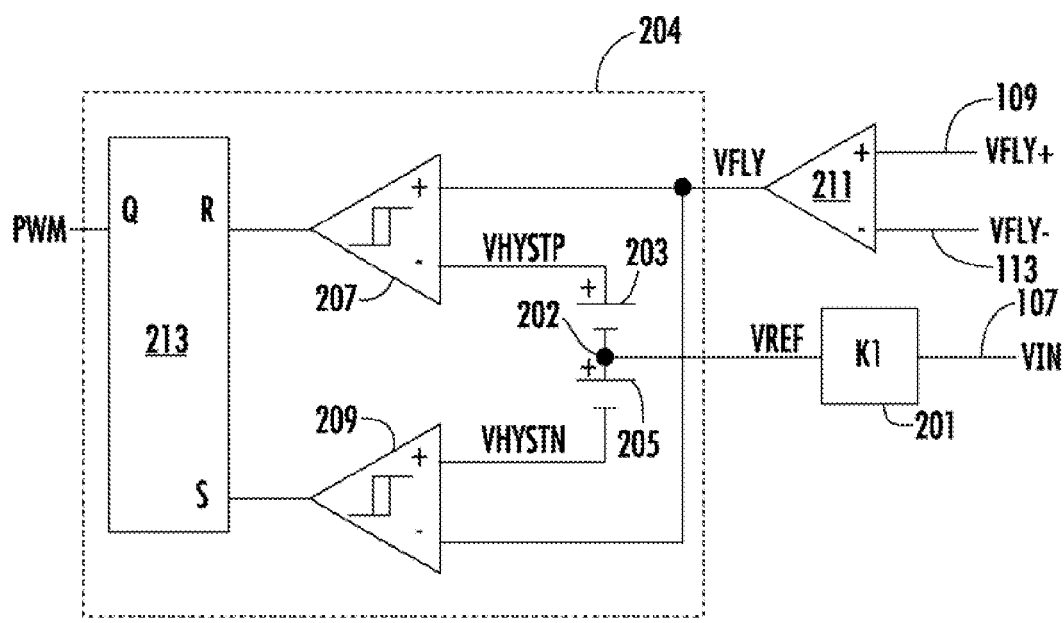
FIG. 2 is a more detailed schematic diagram of the hysteretic mode controller of FIG. 1 according to an exemplary embodiment.

FIG. 2 is a more detailed schematic diagram of the hysteretic mode controller 104 according to an exemplary embodiment. The hysteretic mode controller 104 includes a gain circuit 201 having an input coupled to input node 107 to receive the VIN signal and an output coupled to a node 202 developing a reference voltage VREF within a hysteretic comparator circuit 204. The gain circuit 201 multiplies VIN by a gain value K1, which is any suitable fraction between 0 and 1. In one embodiment, the hysteretic mode controller 104 operates to control the voltage level of VOUT to be approximately one-half the voltage level of VIN. In this embodiment, K1=½ to provide the voltage of VREF to be approximately one-half the voltage level of VIN. The hysteretic comparator circuit 204 includes first and second voltage sources 203 and 205, first and second hysteretic comparators 207 and 209, and a logic circuit 213. The first voltage source 203 has its negative terminal coupled to node 202 and its positive terminal coupled to the inverting or negative input of the first hysteretic comparator 207. The second voltage source 205 has its positive terminal coupled to the node 202 and its negative terminal coupled to the non-inverting or positive input of the second hysteretic comparator 209. The voltage sources 203 and 205 have relatively small voltages to develop a hysteretic voltage window just above and below VREF, shown as VHYSTP and VHYSTN, respectively. The hysteretic mode controller 104 includes an amplifier 211 (e.g., a differential amplifier) having a non-inverting or positive input coupled to node 109 for receiving the VFLY+ signal and an inverting or negative input coupled to node 113 for receiving the VFLY− signal. The amplifier 211 has an output coupled to the non-inverting input of the comparator 207 and to the inverting input of the comparator 209. The amplifier 211 amplifies the voltage difference between VFLY+ and VFLY− to develop a signal VFLY provided as another input of the hysteretic comparator circuit 204.

The outputs of the comparators 207 and 209 are provided to respective inputs of the logic circuit 213. In one embodiment, the logic circuit 213 is a set-reset (SR) logic circuit (such as an SR flip-flop or latch circuit or the like) having a reset (R) input coupled to the output of the comparator 207, a set (S) input coupled to the output of the comparator 209, and a Q output providing the PWM signal. In operation, when the voltage VFLY+, VFLY− across the flying capacitor C3 causes the VFLY voltage to fall below VHSYTN, the comparator 209 asserts its output high to cause the logic circuit 213 to assert the PWM signal high, and when the voltage VFLY+, VFLY− across the capacitor C3 causes the VFLY voltage to rise above VHSYTP, the comparator 207 asserts its output high to cause the logic circuit 213 to assert the PWM signal low. It is noted that as the load current IL increases, the capacitor C3 charges more quickly when the switches Q1 and Q3 are turned on (and the switches Q2 and Q4 are turned off) and that the capacitor C3 discharges more quickly when the switches Q2 and Q4 are turned on (and the switches Q1 and Q3 are turned off). In this manner, the switching frequency of the PWM signal, as controlled by the hysteretic mode controller 104, increases with increasing load current IL.

Figure 3:
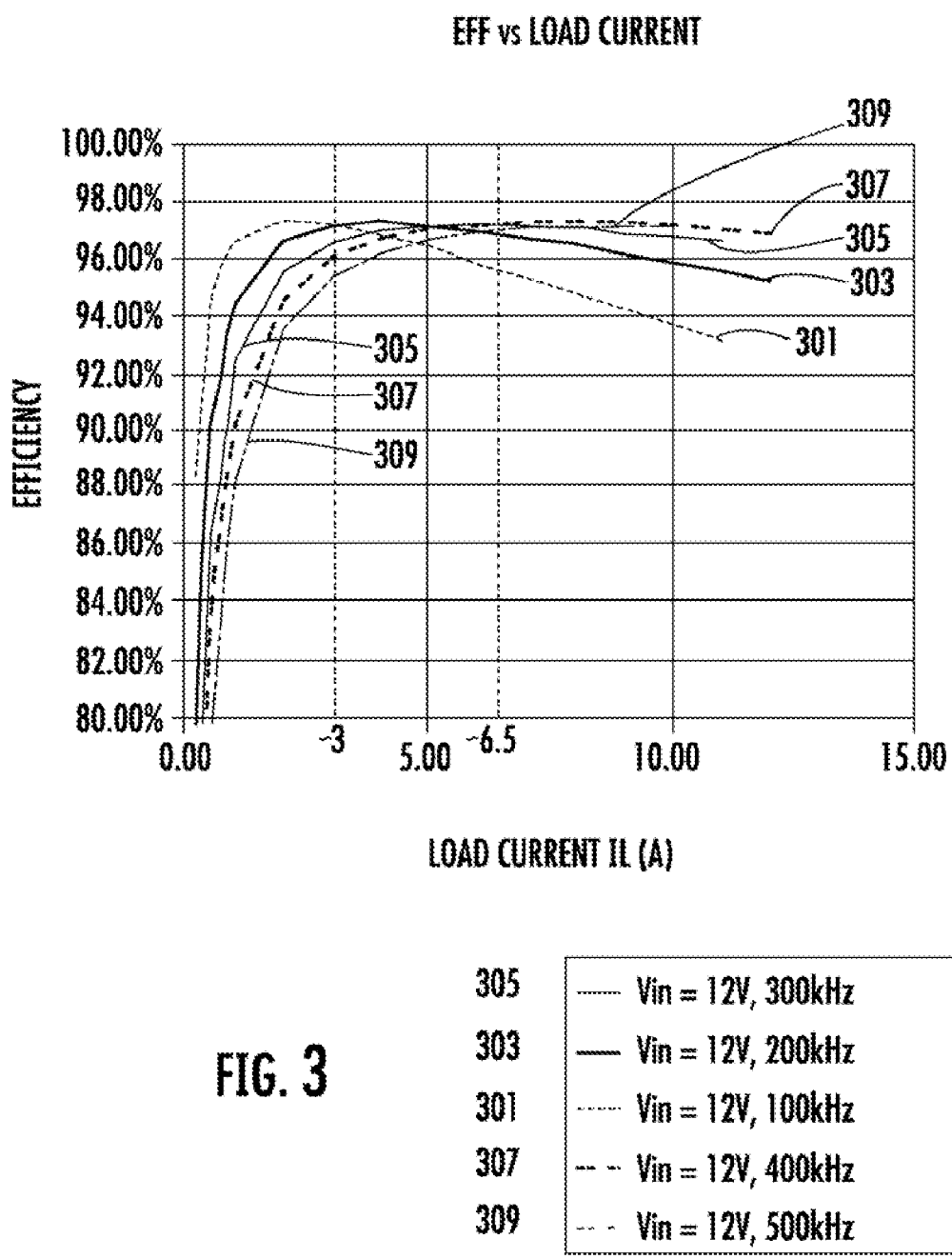
FIG. 3 is a graph diagram plotting percentage efficiency of the capacitor voltage divider of FIG. 1 versus load current for various fixed frequencies of the PWM signal having a 50% duty cycle.

FIG. 3 is a graph diagram plotting percentage efficiency of the capacitor voltage divider 102 versus load current IL in Amperes (A) for various fixed frequencies of the PWM signal having a 50% duty cycle. In each case the input voltage VIN is the same (e.g., 12 volts) and the load current IL is increased from 0 to over 10 A. Several curves 301, 303, 305, 307 and 309 are plotted for switching frequencies 100, 200, 300, 400 and 500 kilohertz (kHz), respectively. The curve 301 for 100 kHz illustrates that efficiency is higher for the switching frequency of 100 kHz for load current IL up to about 3 A. From about 3 A to 5 A, efficiency is higher for switching frequency of 200 kHz as shown by curve 303. From about 5 A to 6.5 A, efficiency is higher for switching frequency of 300 kHz as shown by curve 305. From about 6.5 to 10 A, efficiency is higher for switching frequency of 400 kHz as shown by curve 307. And above 10 A, efficiency is highest for switching frequency of 500 kHz as shown by curve 309. In general, FIG. 3 illustrates that efficiency of the capacitor voltage divider 102 is maintained at a higher level when switching frequency is increased with increased load current.

Figure 4:
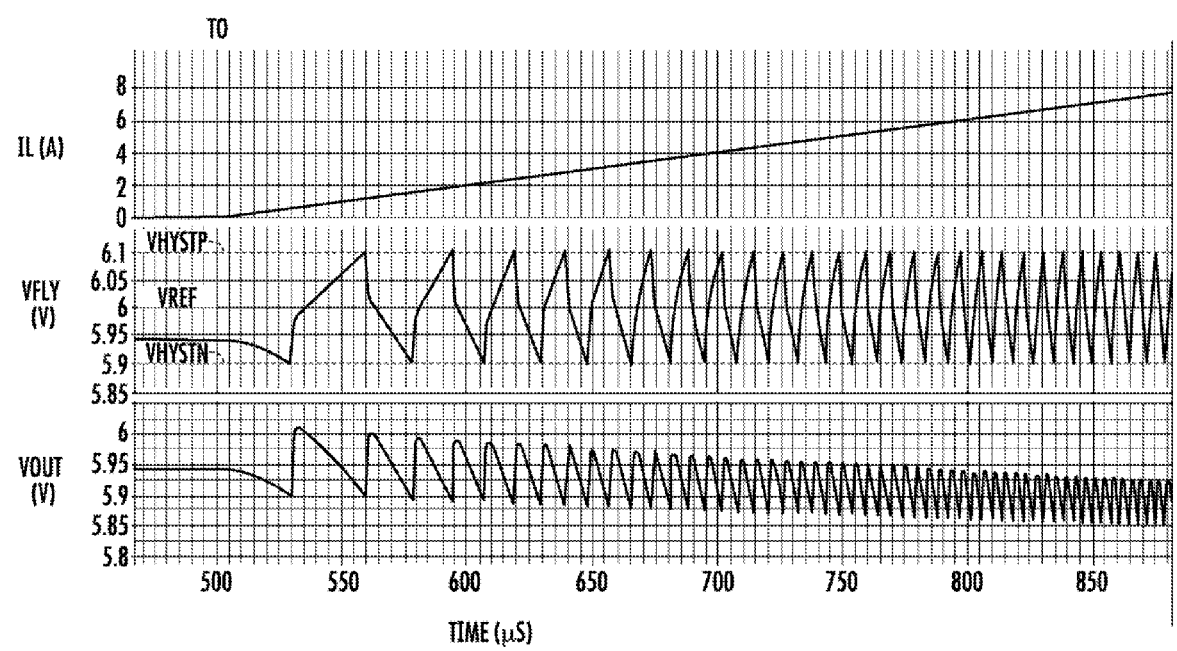
FIG. 4 is a graph diagram plotting load current IL, VFLY, and VOUT voltages versus time for an exemplary embodiment of the capacitor voltage divider with hysteretic mode control circuit of FIG. 1.

FIG. 4 is a graph diagram plotting load current IL (A), VFLY (in Volts or V), and VOUT (V) versus time (in microseconds or μs) for an exemplary embodiment of the capacitor voltage divider with hysteretic mode control circuit 100. VREF is set to approximately 12V and the voltage of each voltage source 203 and 205 is approximately 0.1V, so that VHYSTP is approximately 6.1V and VHYSTN is approximately 5.9V. In this manner, VFLY has a ripple voltage and oscillates between VHYSTP and VHYSTN. At a time T0, the load current IL increases linearly from a lower current level (e.g., 0A) towards a higher current level (e.g., 8 A). As the load current IL increases, the time of charging and discharging of the fly capacitor decreases so that the switching frequency increases. In this manner, the switching frequency increases with increasing load current, so that efficiency is maintained at a higher level as compared to a constant frequency configuration. The output voltage VOUT also has a ripple voltage and remains centered between approximately 5.9 and 5.95V, while decreasing slightly for larger load current IL.

Figure 5:
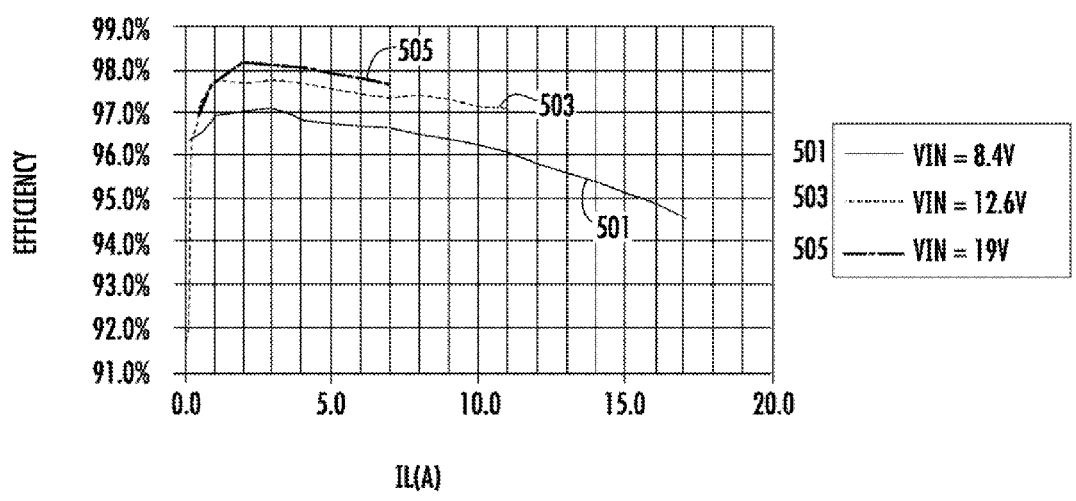
FIG. 5 is a graph diagram plotting efficiency of the an exemplary embodiment of the capacitor voltage divider with hysteretic mode control circuit of FIG. 1 with load current for various input levels of the input voltage VIN.

FIG. 5 is a graph diagram plotting efficiency of the an exemplary embodiment of the capacitor voltage divider with hysteretic mode control circuit 100 with load current for various input levels of the input voltage VIN. As shown, a first curve 501 is plotted for VIN=8.4V, a second curve 503 is plotted for VIN=12.6V, and a third curve 505 is plotted for VIN=19V. FIG. 5 illustrates that efficiency increases with increasing level of the input voltage VIN. Yet even at a relatively low VIN level of 8.4V, the efficiency is relatively high up to IL=15 A (e.g., above 95%).

Figure 6:
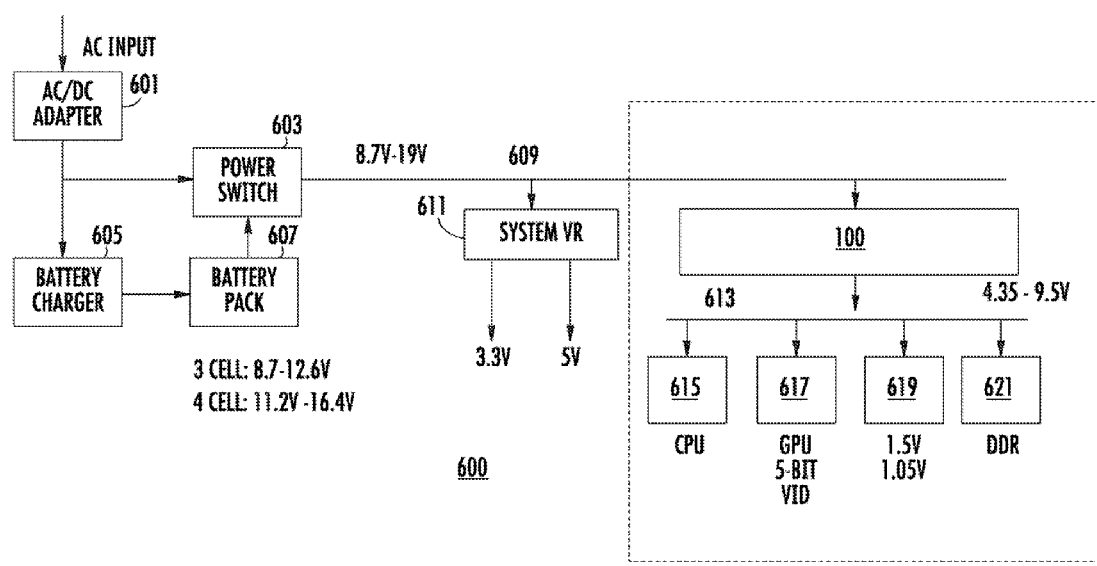
FIG. 6 is a block diagram illustrating an exemplary use of the capacitor voltage divider with hysteretic mode control circuit of FIG. 1 in a power conversion circuit.

FIG. 6 is a block diagram illustrating an exemplary use of the capacitor voltage divider with hysteretic mode control circuit 100 in a power conversion circuit. An AC input signal is provided to an AC/DC adapter 601 providing DC voltage to a power switch 603 and a battery charger 605. The battery charger 605 charges a battery pack 607 when the AC input signal is available. The power switch 603 converts the DC input voltage to provide power via a first power bus 609 with voltage within a range 8.7V-19V. The battery pack 607 provides power to the power switch 603 when the AC input signal is not available. A system voltage regulator (VR) is coupled to the power bus 609 and provides regulated voltage signals at 3.3V and 5V. The capacitor voltage divider with hysteretic mode control circuit 100 is shown dividing the voltage of the power bus 609 to a second power bus 613 with voltage within a half range 4.35V-9.5V. Various devices are coupled to the power bus 613, including a central processing unit (CPU) 615, a graphics processing unit (GPU) 617 providing a 5-bit VID (voltage identification) interface, a voltage dual switcher block 619 providing computer voltage rail levels 1.5V and 1.05V (e.g., used to power memory control hub chip set, front side bus, wireless communications, etc.), and a double data rate (DDR) regulator device 621 for providing power to DDR memory devices.

A hysteretic mode controller is disclosed which provides a pulse width modulation (PWM) signal for controlling a capacitor voltage divider. The capacitor voltage divider has a flying capacitor and divides an input voltage to provide an output voltage. In one embodiment, the hysteretic mode controller includes an amplifier, a gain circuit and a hysteretic comparator circuit. The amplifier has an input for coupling to the flying capacitor and an output providing a fly voltage. The gain circuit has an input for receiving the input voltage and an output coupled to a reference node providing a reference voltage. The hysteretic comparator circuit has a first input coupled to the output of the amplifier, a second input receiving the reference voltage, and an output for providing the PWM signal.

In one embodiment the gain circuit has a gain between zero and one. In a more specific embodiment the gain circuit has a gain of approximately one-half. The hysteretic comparator circuit compares the reference voltage with a hysteretic voltage window based on the reference voltage. In one embodiment, the hysteretic comparator circuit includes first and second voltage sources, first and second comparators, and a logic circuit. In a more specific embodiment, the first voltage source is coupled to the reference node and provides a positive hysteretic voltage. The second voltage source is coupled to the reference node and provides a negative hysteretic voltage. The first comparator has a first input coupled to the output of the amplifier, a second input receiving the positive hysteretic voltage, and an output. The second comparator has a first input coupled to the output of the amplifier, a second input receiving the negative hysteretic voltage, and an output. The logic circuit has a first input coupled to the output of the first comparator, a second input coupled to the output of the second comparator, and an output providing the PWM signal. The logic circuit may be a set-reset flip-flop having a set input coupled to the output of the second comparator, a reset input coupled to the output of the first comparator, and an output for providing the PWM signal.

A capacitor voltage divider with hysteretic mode control according to another embodiment includes a capacitive voltage divider and a hysteretic mode control circuit. In one embodiment, the capacitor voltage divider includes second and third capacitors, first and second switching circuits, and a switch driver circuit. The second capacitor is coupled between the input node and the output node. The third capacitor is coupled between the output node and a second reference node (e.g., ground). The first switching circuit is coupled between the input node and the output node and forms a first phase node. The second switching circuit is coupled between the output node and the second reference node and forms a second phase node. The switch driver circuit has an input receiving the PWM signal, a first output coupled to the first switching circuit and a second output coupled to the second switching circuit. The flying capacitor is coupled between the first and second phase nodes.

A method of providing a PWM signal to control a capacitor voltage divider, where the capacitor voltage divider has a flying capacitor and divides an input voltage to an output voltage, includes determining the voltage across the flying capacitor and providing a corresponding fly voltage, amplifying the input voltage to provide a reference voltage, and comparing the fly voltage within a hysteretic voltage window based on the reference voltage to provide the PWM signal.

The method may include amplifying the voltage across the flying capacitor using a differential amplifier. The method may include multiplying the input voltage by a gain between zero and one. The method may include adding a first voltage to the reference voltage to provide a positive hysteretic voltage, subtracting a second voltage from the reference voltage to provide a negative hysteretic voltage, where the positive and negative hysteretic voltages determine the hysteretic voltage window. The method may include comparing the fly voltage with the positive hysteretic voltage to provide a first logic signal, comparing the fly voltage with the negative hysteretic voltage to provide a second logic signal, and determining the state of the PWM signal based on the first and second logic signals. The method may include asserting the PWM signal high when the second logic signal is high and asserting the PWM signal low when the first logic signal is high.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A hysteretic mode controller for providing a pulse width modulation (PWM) signal for controlling a capacitor voltage divider which has a flying capacitor and which divides an input voltage to provide an output voltage, said hysteretic mode controller comprising:
    an amplifier having an input for coupling to the flying capacitor and an output providing a fly voltage;
    a gain circuit having an input for receiving the input voltage and an output coupled to a reference node providing a reference voltage; and
    a hysteretic comparator circuit having a first input coupled to said output of said amplifier, a second input receiving said reference voltage, and an output for providing the PWM signal.

2. The hysteretic mode controller of claim 1, wherein said amplifier comprises an differential amplifier having an inverting input for coupling to a first end of the flying capacitor and a non-inverting input for coupling to a second end of the flying capacitor.

3. The hysteretic mode controller of claim 1, wherein said gain circuit has a gain between zero and one.

4. The hysteretic mode controller of claim 1, wherein said gain circuit has a gain of approximately one-half.

5. The hysteretic mode controller of claim 1, wherein said hysteretic comparator circuit compares said reference voltage with a hysteretic voltage window based on said reference voltage.

6. The hysteretic mode controller of claim 1, wherein said hysteretic comparator circuit comprises:
    a first voltage source coupled to said reference node and providing a positive hysteretic voltage;
    a second voltage source coupled to said reference node and providing a negative hysteretic voltage;
    a first comparator having a first input coupled to said output of said amplifier, a second input receiving said positive hysteretic voltage, and an output;
    a second comparator having a first input coupled to said output of said amplifier, a second input receiving said negative hysteretic voltage, and an output; and
    a logic circuit having a first input coupled to said output of said first comparator, a second input coupled to said output of said second comparator, and an output providing the PWM signal.

7. The hysteretic mode controller of claim 6, wherein said logic circuit comprises a set-reset flip-flop having a set input coupled to said output of said second comparator, a reset input coupled to said output of said first comparator, and an output for providing the PWM signal.

8. A capacitor voltage divider with hysteretic mode control, comprising:
a capacitor voltage divider which divides an input voltage on an input node to provide an output voltage on an output node, said capacitor voltage divider having a control input receiving a pulse width modulation (PWM) signal and comprising a flying capacitor; and
a hysteretic mode control circuit, comprising:
an amplifier having an input coupled to said flying capacitor and an output providing a fly voltage;
a gain circuit having an input coupled to said input node and an output coupled to a first reference node providing a reference voltage; and
a hysteretic comparator circuit having a first input coupled to said output of said amplifier, a second input coupled to said first reference node, and an output providing said PWM signal.

9. The capacitor voltage divider with hysteretic mode control of claim 8, wherein said capacitor voltage divider comprises:
a second capacitor coupled between said input node and said output node;
a third capacitor coupled between said output node and a second reference node;
a first switching circuit coupled between said input node and said output node and forming a first phase node;
a second switching circuit coupled between said output node and said second reference node and forming a second phase node; and
a switch driver circuit having an input receiving said PWM signal, a first output coupled to said first switching circuit and a second output coupled to said second switching circuit;
wherein said flying capacitor is coupled between said first and second phase nodes.

10. The capacitor voltage divider with hysteretic mode control of claim 9, wherein:
said first switching circuit comprises:
a first upper switch having a control input and having a pair of current terminals coupled between said input node and said first phase node; and
a first lower switch having a control input and having current terminals coupled between said first phase node and said output node;
wherein said second switching circuit comprises:
a second upper switch having a control input and having current terminals coupled between said output node and said second phase node; and
a second lower switch having a control input and having current terminals coupled between said second phase node and said second reference node; and
wherein said switch driver circuit includes first, second, third and fourth outputs coupled to said control inputs of said first upper, first lower, second upper and second lower switches, respectively, and wherein said switch driver circuit activates said first and second upper switches while said PWM signal is in a first state and activates said first and second lower switches while said PWM signal is in a second state.

11. The capacitor voltage divider with hysteretic mode control of claim 8, wherein said gain circuit has a gain of approximately one-half.

12. The capacitor voltage divider with hysteretic mode control of claim 8, wherein said amplifier comprises a differential amplifier having an inverting input coupled to a first end of said flying capacitor and a non-inverting input coupled to a second end of said flying capacitor.

13. The capacitor voltage divider with hysteretic mode control of claim 8, wherein said hysteretic comparator circuit comprises:
first and second voltage sources coupled to said first reference node for providing a positive hysteretic voltage and a negative hysteretic voltage, respectively;
a first comparator having a first input coupled to said output of said amplifier, a second input receiving said positive hysteretic voltage, and an output;
a second comparator having a first input coupled to said output of said amplifier, a second input receiving said negative hysteretic voltage, and an output; and
a logic circuit having inputs coupled to said outputs of said first and second comparators and an output providing said PWM signal.

14. The capacitor voltage divider with hysteretic mode control of claim 13, wherein said logic circuit comprises a set-reset flip-flop having a set input coupled to said output of said second comparator, a reset input coupled to said output of said first comparator, and an output providing said PWM signal.

15. A method of providing a pulse width modulation (PWM) signal to control a capacitor voltage divider which has a flying capacitor and which divides an input voltage to an output voltage, comprising:
determining the voltage across the flying capacitor and providing a corresponding fly voltage;
amplifying the input voltage to provide a reference voltage; and
comparing the fly voltage within a hysteretic voltage window based on the reference voltage to provide the PWM signal.

16. The method of claim 15, wherein said determining the voltage across the flying capacitor comprises amplifying the voltage across the flying capacitor using a differential amplifier.

17. The method of claim 15, wherein said amplifying the input voltage comprises multiplying the input voltage by a gain between zero and one.

18. The method of claim 15, further comprising:
adding a first voltage to the reference voltage to provide a positive hysteretic voltage; and
subtracting a second voltage from the reference voltage to provide a negative hysteretic voltage;
wherein the positive and negative hysteretic voltages determine the hysteretic voltage window.

19. The method of claim 18, wherein said comparing the fly voltage within a hysteretic voltage window comprises:
comparing the fly voltage with the positive hysteretic voltage to provide a first logic signal;
comparing the fly voltage with the negative hysteretic voltage to provide a second logic signal; and
determining the state of the PWM signal based on the first and second logic signals.

20. The method of claim 19, wherein said determining the state of the PWM signal comprises asserting the PWM signal high when the second logic signal is high and asserting the PWM signal low when the first logic signal is high.

* * * * *